(No Model.)

S. D. SILVER.
DEVICE FOR THAWING FROZEN PIPES.

No. 558,992. Patented Apr. 28, 1896.

Attest.
Fenelon R. Brock
A. W. Bayard.

Inventor.
Sam D. Silver
per Fred E. Tasker,
Atty.

UNITED STATES PATENT OFFICE.

SAM DOUGLAS SILVER, OF IDAHO SPRINGS, COLORADO.

DEVICE FOR THAWING FROZEN PIPES.

SPECIFICATION forming part of Letters Patent No. 558,992, dated April 28, 1896.

Application filed August 16, 1895. Serial No. 559,536. (No model.)

*To all whom it may concern:*

Be it known that I, SAM DOUGLAS SILVER, a citizen of the United States, residing at Idaho Springs, in the county of Clear Creek and State of Colorado, have invented certain new and useful Improvements in Devices for Thawing Frozen Pipes; and I do hereby declare the following to be a full, clear, and exact description of the invention, such as will enable others skilled in the art to which it appertains to make and use the same.

My present invention relates to a device for use in thawing and thereby opening frozen water-pipes of various kinds, either large or small, without the necessity of being obliged to dig them up for the purpose of making the water flow, the object of the invention being to provide a simple and cheap device which can be used with little difficulty wherever required, and which will be found of immense advantage in unclosing pipes choked with ice, which otherwise would have to be taken up at great expense and then thawed and relaid with a large amount of trouble; and the invention therefore consists, essentially, in the construction, arrangement, and combination of parts substantially as will be hereinafter described and claimed.

Figure 1:
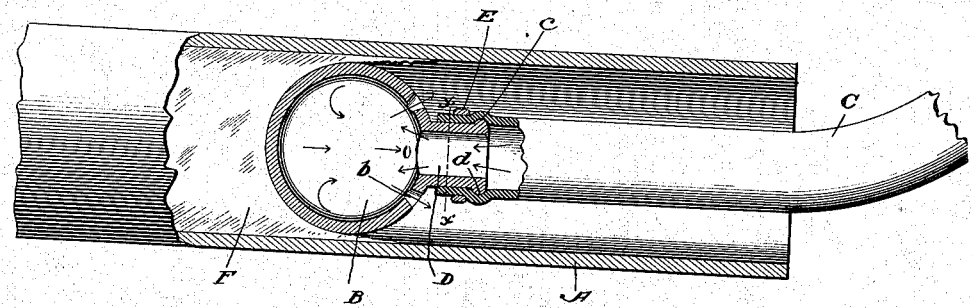
Figure 2:
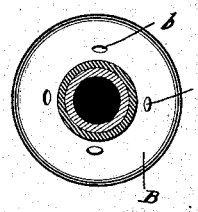
Figure 3:
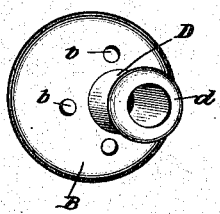

In the annexed drawings, illustrating my invention, Figure 1 is a longitudinal sectional view of my improved device for thawing frozen pipes. Fig. 2 is a cross-sectional elevation on the line $x$ $x$ of Fig. 1 of the globular device which is propelled through the frozen pipe. Fig. 3 is a perspective view of said globular device.

Similar letters of reference designate corresponding parts throughout the different figures of the drawings.

A denotes an example of a pipe filled with ice, as shown at F, whereby the flow of the water through pipe A is obstructed and the pipe rendered temporarily useless until the frozen obstruction is removed. Pipe A may be of any desired size, inasmuch as my invention is equally applicable to all kinds of pipes containing water or any other liquid which is adapted to solidify and clog the bore of the pipe.

B denotes a hollow ball or globe, which is adapted to be inserted into one end of the frozen pipe A. This globular device B may be of any suitable diameter and is preferably of such size as to suit it for convenient admission into the pipe and an easy travel through the pipe. The ball B is provided with the tubular projection D, having a flanged end $d$. The wall of the ball B is provided with a number of perforations or orifices $b$ $b$, through which the steam which enters the interior of the ball B through the tubular projection D can easily escape. These perforations $b$ are preferably adjacent to the projection D, in order that the steam may escape from the ball in a direction opposite to that in which the ball is traveling, and may, as a result of such escape, propel the ball forward.

Attached to the projection D is a flexible tube or hose-pipe C, which runs from some suitable steam supply—as, for instance, a convenient portable boiler. The tube C is connected to the projection D of the ball B by being placed over the flange $d$, a ridge $c$ being thus made in the hose C, and a clamp E is employed to hold the end of the hose C tightly and efficiently upon the projection D.

It will thus be seen that I introduce into the frozen pipe a globular thawing device, which is connected by means of a flexible connection with a supply of steam or other hot substance or mixture which will thaw the ice. When this globular device or ball has been introduced into the frozen pipe and the steam is allowed to course through the hose C, the result will be that the steam under pressure will heat the ball B very hot and thus thaw the ice with which it comes into contact. The steam which enters the ball B through the tubular projection D in the direction shown by the arrows will escape in a reverse direction through the perforations $b$, as likewise shown by the other arrows. The back pressure of the steam in escaping from the ball B forces the latter ahead, and as it progresses through the pipe the ice in advance thereof will be melted. Obviously as the ball progresses through the pipe the hose will be drawn after it. The ball being round and thus flexibly attached can follow all the bends and elbows in the pipe through which it is traveling, and consequently will be enabled to efficiently melt all the ice which may be in the pipe and effectually unclose the latter.

Having thus described my invention, what

I claim as new, and desire to secure by Letters Patent, is—

1. In a device for thawing frozen pipes, a steam heated and propelled ball traveling through the pipe.

2. In a device for thawing pipes, a globular device traveling through the pipe, and having steam inlet and outlet.

3. In a device for thawing frozen pipes, the combination with a traveling ball, of a flexible connection with the steam supply, substantially as specified.

4. In a device for thawing pipes, the combination of the globular device having perforations and the tubular projection, and a flexible steam-supply pipe attached to said projection, substantially as described.

In testimony whereof I affix my signature in presence of two witnesses.

SAM DOUGLAS SILVER.

Witnesses:
G. E. ARMSTRONG,
GEO. W. WALLACE.